US011965378B2

(12) United States Patent
Göppert-Boenke

(10) Patent No.: US 11,965,378 B2
(45) Date of Patent: Apr. 23, 2024

(54) REVOLVING DOOR AND ROOM ACCESS ARRANGEMENT HAVING TWO REVOLVING DOORS

(71) Applicant: Astra Gesellschaft für Asset Management mbH & Co. KG, Barsinghausen (DE)

(72) Inventor: Klaus Göppert-Boenke, Bad Salzdetfurth (DE)

(73) Assignee: ASTRA GESELLSCHAFT FUER ASSET MANAGEMENT MBH & CO. KG, Barsinghausen (DE)

( * ) Notice: Subject to any disclaimer, the term of this patent is extended or adjusted under 35 U.S.C. 154(b) by 949 days.

(21) Appl. No.: 16/536,502

(22) Filed: Aug. 9, 2019

(65) Prior Publication Data

US 2020/0048956 A1 Feb. 13, 2020

(51) Int. Cl.
*E06B 3/90* (2006.01)

(52) U.S. Cl.
CPC .......... *E06B 3/90* (2013.01); *E05Y 2900/132* (2013.01)

(58) Field of Classification Search
None
See application file for complete search history.

(56) References Cited

U.S. PATENT DOCUMENTS 387,571 A 8/1888 Van Kannel
841,696 A * 1/1907 Lang .......................... E05C 7/002 49/142
1,417,372 A * 5/1922 Friedland .................. E06B 3/90 49/208
4,627,193 A * 12/1986 Schwarz ................ E05G 5/003 49/31
RE33,407 E * 10/1990 Schwarz ................ E05F 15/70 49/31
5,203,111 A * 4/1993 Huber .................... E05G 5/003 49/42
5,475,377 A * 12/1995 Lee ...................... G07F 7/1008 340/5.9

(Continued)

FOREIGN PATENT DOCUMENTS

CN 108681763 A * 10/2018 .............. E06B 5/18
DE 103 31 742 A1 2/2005

(Continued)

*Primary Examiner* — Catherine A Kelly
(74) *Attorney, Agent, or Firm* — WCF IP

(57) ABSTRACT

The invention relates to a revolving door (1) having a rotatable door leaf element (3) which has at least three door leaves (5) which are fitted to a vertical centre axle (4), and having at least one part-circular wall portion (6*a*, 6*b*) which is arranged adjacent to the rotation circle of the door leaf element (3), wherein an electronic reading unit (7) for wireless reading of data from transponders (11) is orientated towards a reading space delimited by the wall portion (6*a*, 6*b*) and a pair of door leaves (5), wherein the wall portion (6*a*, 6*b*) which delimits the reading space covers the pair of door leaves (5) which form a passage space in a reading position of the revolving door (1) in order to contribute via the door leaf element (3) and the wall portion (6*a*, 6*b*) which overlaps the door leaf (5) to the electromagnetic shielding of the reading space in the reading position.
The invention further relates to a room access arrangement (13) having two revolving doors (1*a*, 1*b*).

8 Claims, 5 Drawing Sheets

(56) References Cited

U.S. PATENT DOCUMENTS

| | | | | | |
|---|---|---|---|---|---|
| 5,886,634 | A * | 3/1999 | Muhme | G08B 13/2454 340/5.31 |
| 7,104,008 | B2 * | 9/2006 | Yokotachi | E06B 3/90 49/40 |
| 7,360,695 | B2 * | 4/2008 | Ponert | G07C 9/28 235/382 |
| 7,513,423 | B2 * | 4/2009 | Kocznar | G07C 9/00944 235/382 |
| 7,900,398 | B2 | 3/2011 | Liles | |
| 8,674,805 | B2 * | 3/2014 | Charych | G07C 9/28 340/5.82 |
| 8,994,512 | B2 * | 3/2015 | Kasai | G06K 7/10356 340/572.1 |
| 9,098,954 | B1 * | 8/2015 | Byrd | G01S 3/04 |
| 9,330,549 | B2 * | 5/2016 | Kellermann | E06B 3/90 |
| 9,862,567 | B2 * | 1/2018 | Saari | B66B 3/006 |
| 11,164,143 | B1 * | 11/2021 | Gray | G07F 9/002 |
| 2006/0160484 | A1 * | 7/2006 | Falk | F24F 9/00 454/195 |
| 2009/0119995 | A1 * | 5/2009 | Kucer | E06B 11/085 49/31 |
| 2009/0251283 | A1 * | 10/2009 | Ito | G07C 9/28 340/5.61 |
| 2012/0090239 | A1 | 4/2012 | Hondius | |
| 2015/0314983 | A1 * | 11/2015 | Saari | B66B 1/2458 187/382 |

FOREIGN PATENT DOCUMENTS

| | | | | |
|---|---|---|---|---|
| DE | 202005014179 | U1 * | 4/2006 | G06K 19/07749 |
| DE | 20 2012 102 617 | U1 | 10/2012 | |
| DE | 20 2012 101 362 | U1 | 6/2013 | |
| DE | 20 2017 100 982 | U1 | 6/2017 | |

* cited by examiner

REVOLVING DOOR AND ROOM ACCESS ARRANGEMENT HAVING TWO REVOLVING DOORS

The invention relates to a revolving door having a rotatable door leaf element which has at least three door leaves which are fitted to a vertical centre axle, and having at least one part-circular wall portion which is arranged adjacent to the rotation circle of the door leaf element.

The invention further relates to a room access arrangement having two such revolving doors.

The arrangement of revolving doors having a rotatable door leaf element in a wall aperture for access into an inner space of a building is adequately known. They are used primarily as airlocks and to separate persons.

Revolving doors acting as storm doors are known from U.S. Pat. No. 387,571 A.

DE 20 2012 101 362 U1 sets out, for example, a conventional rotary revolving door comprising two cylindrical boundary part-walls which are arranged opposite each other and between which a vertically rotatably supported door rotation axle with door leaves is arranged.

DE 103 31 742 A1 discloses a revolving door with an entry-side input unit, by means of which a security or identification code can be transmitted to a control unit. The input unit may contain a keyboard, a magnetic card reader, a video camera, a fingerprint sensor or the like. With the safety or identification code, the access through the revolving door can be permitted or refused.

DE 20 2017 100 982 U1 sets out a device for stock monitoring of goods which are provided with transponders, having a storage space, a person separation device and a goods passage which has a detection device to detect goods which are provided with transponders. The person separation device and the goods passage are constructed separately. The person separation device may have a goods detection device for carried goods, such as, for example, an RFID reading unit.

DE 20 2012 102 617 U1 discloses a lock for receiving a person, the contactless identification thereof and for identifying carried textiles. Another access to the room which is closed with the lock is possible via another entry door, which is provided with a chip card reader for access control.

Based on this, the object of the present invention is to set out an improved revolving door which, when passing through, ensures reliable wireless reading of data using transponders by means of an electronic reading unit.

The object is achieved with a revolving door having the features of claim 1. Advantageous embodiments are described in the dependent claims.

It is proposed that the revolving door have an electronic reading unit for wireless reading of data from transponders which is orientated towards a reading space delimited by the wall portion and a pair of door leaves. The wall portion which delimits the reading space covers the pair of door leaves which form a passage space in a reading position of the revolving door. The wall portion and the pair of door leaves which form the passage space are arranged and constructed in such a manner that the door leaf element and the wall portion which overlaps the door leaf contribute to the electromagnetic shielding of the reading space in the reading position.

The reading of the transponders when passing quickly through during the rotation of the revolving door is completed in the short time of a few seconds (approximately 2-5 seconds, preferably three seconds) in which the passage space is electromagnetically shielded in order to surround the housing. Consequently, the passage space is in the corresponding rotation position of the door leaves electromagnetically closed by means of the door leaf element and the wall portion using an overlap so that the passage space is substantially shielded for a passage of high-frequency electromagnetic waves.

To this end, the door panels of the door leaves may be electromagnetically shielded, for example, with a metal film or a metal grid. Consequently, the passage space delimited by the door leaf and the adjacent wall portion is electromagnetically shielded.

However, it is also conceivable for a metal-shielded partition wall to adjoin the door frames adjacent to the respective wall portion. Consequently, the inner space of the revolving door formed by both wall portions and the partition walls is on the whole electromagnetically shielded outwards. The opposing passage spaces in the door leaf element are not then electromagnetically shielded from each other. This is also not required if it is ensured that the two passage spaces are not used at the same time by different people.

Consequently, the door leaves which delimit a passage space can optionally be connected at the side of the respective door leaf opposite the passage space by means of a partition wall in each case to a door leaf which precedes or follows in the rotation direction. Consequently, a passage space of the revolving door which follows the passage space in the rotation direction is closed by means of the partition wall and cannot be entered. It is consequently ensured that the electronic reading unit exclusively reads the transponders located in the accessible passage space and not any additional transponders located in the environment of this accessible passage space. In addition, access to the revolving door by another person is prevented whilst an accessible passage space is still occupied by a person.

Consequently, the reading region does not have to be limited to the part-circle delimited by the door leaf. Instead, the entire housing can be used as a reading cell since in any case only a part-circle is used by a person for passage. With an electromagnetically shielded partition wall, it is also then ensured that the electronic reading unit does not transmit any electromagnetic waves into the region outside the housing delimited by the wall portions and the partition walls and no transponders outside of this housing can be read.

Consequently, it is possible using a reading unit which is directed towards the passage space for transponders to be able to be reliably read during the reading position.

The electronic reading unit may in this instance be controlled in such a manner that it is activated only in the reading position and emits electromagnetic waves and otherwise emits no electromagnetic waves for interrogating transponders.

The door leaf element may have two mutually opposing passage spaces which are each delimited by a pair of door leaves. Consequently, it may be possible, after a person has used the revolving door, for the two passage spaces each to be positioned in the open entry region and opposing exit region which are adjoined in each case by the part-circular wall portions. The part-circular wall portions form together with the open entry and exit region a type of cylindrical member in which the door leaf elements are rotatably received. The revolving door can consequently be used without motorised support and after a person has passed through can be used again by the positioning of the mutually opposing passage spaces at the open entry and exit region of the revolving door.

A rotation direction limitation element which is constructed to determine the rotation direction of the door leaf element may be coupled to the door leaf. Consequently, the rotation direction of the door leaf elements may be limited to a preferred direction. This preferred direction may be either in the clockwise direction or in the counterclockwise direction in plan view.

Sealing elements for electromagnetic shielding may be arranged in the transition between the door leaves and the wall portion which delimits the reading space. Using these sealing elements which are formed, for example, from electrically conductive wires, fibres or sponge structures, the intermediate space between the door leaves and the adjacent wall portion is bridged in an electrically conductive manner. Suitable elements are, for example, carbon fibres or other electrically conductive yarns by means of which a sealing strip in the transition between the door frame of a door leaf and the adjacent wall element for electrically conductive connection of the door frame and wall face is formed. Consequently, an improved shielding of the environment of the passage space from wireless reading of data by the electric reading unit from transponders and from electromagnetic waves transmitted by the transponders is achieved.

It is advantageous if an access control unit is arranged at an entry region and a person presence detector is arranged at an exit region of the revolving door opposite the entry region. Consequently, the access to the entry region can be controlled and in addition the presence of another person at the opposing exit region can be verified.

It is conceivable in this context for a locking element which is connected to a control unit to be coupled to the door leaf element. This is then configured to prevent a rotation of the door leaf element when the access in the entry region has been released by means of the access control unit and in the exit region the presence of a person is detected by means of the person presence detector. In this instance, the person detected in the exit region could enter the revolving door, as could the person in the entry region to which access has been released. The person located in the exit region could then pass through the revolving door in an uncontrolled manner. This is then prevented with the person presence detector for the exit region so that the revolving door can be used only after release by the access control unit via the entry region.

For a revolving door which can be accessed in both directions, an access control unit may be at the entry region and the opposing exit region. A person presence detector for monitoring the entry region and the opposing exit region may also be provided in each case. If only access with an access control unit has been released, it is then verified with the opposing person presence detector whether another person is there. Consequently, using an access control unit, the entry and exit region in the above sense is determined. With a revolving door which can be accessed from both sides, depending on the access direction, via the access control unit which is used in each case the entry and exit region can be transposed.

It is advantageous for a display unit to be arranged at the region of the entry into the revolving door or on at least one door leaf. In this instance, a data processing unit which is configured to display on the display unit the objects which are associated with a user identified for entry into the revolving door and which are provided with a transponder for data reading may be connected to the display unit. When the revolving door is used, it is consequently possible for the user to be informed of the current status of the objects associated with him using the display unit.

This may, for example, when accessing a washing store, be the number of output items of washing provided with transponders, where applicable broken down into the type of items of washing. Thus, when the washing store is entered or when the washing store is left with carried new items of washing, the current status of the items of washing associated with the user can be indicated.

The revolving door may, however, also be used for identifying the different types of objects carried when a user passes through the revolving door. Consequently, for example, it is possible to check the completeness of the equipment of a person with objects and in the event that a predetermined item of equipment is missing, to output a warning signal. This is, for example, conceivable for rescue teams, such as, for example, firemen, who in the event of an alarm pass such a person lock.

The items of equipment carried in this instance by the rescue team are then detected by means of their transponders and associated with the person. In this instance, a control check for completeness can be carried out by means of a comparison with the type and number of the items of equipment predetermined for the rescue team.

The revolving door may have a predetermined entry side and a predetermined exit side and be constructed to release the passage from the entry side to the exit side and to block the passage from the exit side to the entry side. To this end, for example, additional cubicles or automatic doors may be provided and are controlled at the entry side by means of an access control unit.

A room access arrangement for an inner space which can be accessed by means of two revolving doors may in this instance be constructed in such a manner that a first revolving door is arranged with the exit side thereof in an inner space which can be accessed through the revolving doors and the second revolving door is arranged with the entry side thereof in the inner space. Consequently, access to the inner space is possible only via the first revolving door and leaving the inner space is possible only via the second revolving door. Leaving the inner space via the first revolving door is in contrast prevented by means of the predetermined access direction of the two revolving doors.

In this room access arrangement having the two revolving doors, it is conceivable for additional secured accesses via additional doors to be provided. These may, for example, be a material lock for loading or unloading the storage space, whilst the revolving doors are provided for the individual access and the individual removal of objects from the storage space.

The invention is explained in greater detail below with reference to an embodiment with the appended drawings, in which.

Figure 1:
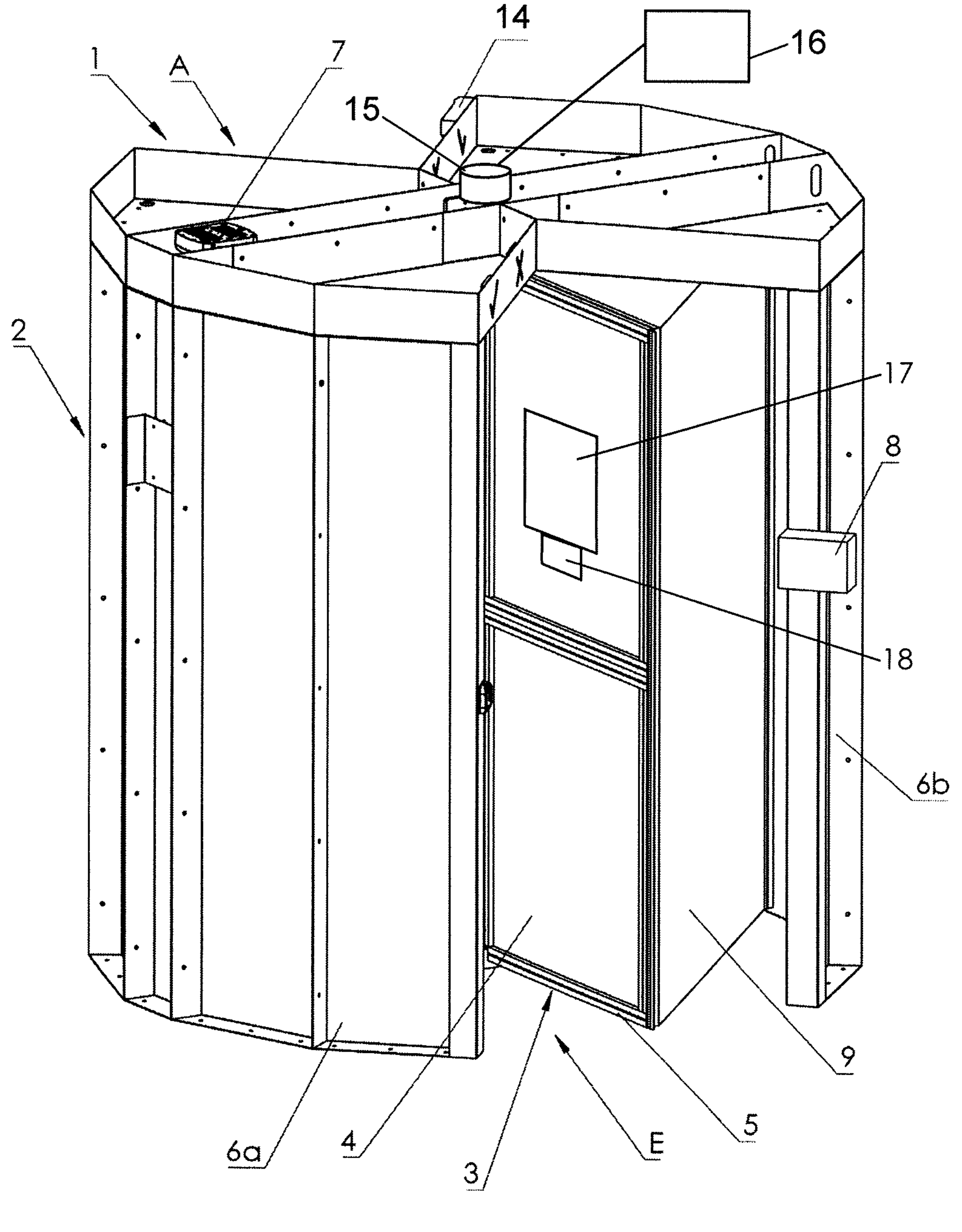
FIG. 1 is a perspective drawing of a revolving door.

FIG. 1 is a perspective view of a revolving door 1. The revolving door 1 has a type of cylindrical body 2 in which a rotatable door leaf element 3 is arranged. The door leaf element 3 has at least three door leaves 5 which are arranged on a vertical centre axle 4. The body 2 has two mutually opposing part-circular wall portions 6*a*, 6*b*. The term part-circular is intended in this context to be understood to mean that the wall portions 6*a*, 6*b* form a round or polygonal part-circle. Consequently, the individual wall faces do not necessarily have to be curved. A plurality of planar wall faces may also be orientated as a polygon on a circular path.

The two mutually opposing wall portions 6*a*, 6*b* each leave an entry region E and an opposing exit region A open through which the revolving door 1 can be entered and left.

It can further be seen that a passage region which is delimited by a wall portion 6*a* and door leaves 5 can be monitored with an electronic reading unit 7. This electronic reading unit 7 is thus directed towards the passage region in order to respond to transponders located therein and to wirelessly read data stored in the transponders. For example, an RFID transmission in the UHF wavelength range is suitable for this purpose.

In the entry region E there is in addition an access control unit 8. Via this access control unit 8, for example, by means of chip card readers, fingerprint sensors, image detection using a camera, speech recognition using a microphone or the like and where applicable a combination thereof and/or by means of access code input via a keyboard, the access for a person into the revolving door 1 can be released. Only then is the door leaf element 3 unlocked and can rotate from an access position in a predetermined rotation direction.

It is further clear that there protrudes from the door leaves 5 a partition wall 9 which extends towards the following door leaf 5 and which closes the space between them by means of the door leaf 5 which is closed by the partition wall 9. Consequently, the access to the intermediate space between two door leaves 5 closed by the partition wall 9 is not accessible.

At the exit region A, which is opposite the predetermined entry region E, there is arranged a person presence detector 14 which, when a passage region (passage space) is entered, ensures that at the same time with a permitted entry into the revolving door 1 via the entry region E no additional person enters the opposing passage space from the exit region A. It is consequently ensured that only ever one person from the entry region E uses a passage space. In addition, the person presence detector 14 can ensure that a revolving door 1 which is released in only one direction is in any case blocked as soon as a person enters the revolving door 1 from the exit region A.

It is advantageous for a display unit 17 to be arranged at the region of the entry into the revolving door or on at least one door leaf. In this instance, a data processing unit 18 which is configured to display on the display unit 17 the objects which are associated with a user identified for entry into the revolving door and which are provided with a transponder for data reading may be connected to the display unit. When the revolving door is used, it is consequently possible for the user to be informed of the current status of the objects associated with him using the display unit 17.

Figure 2:
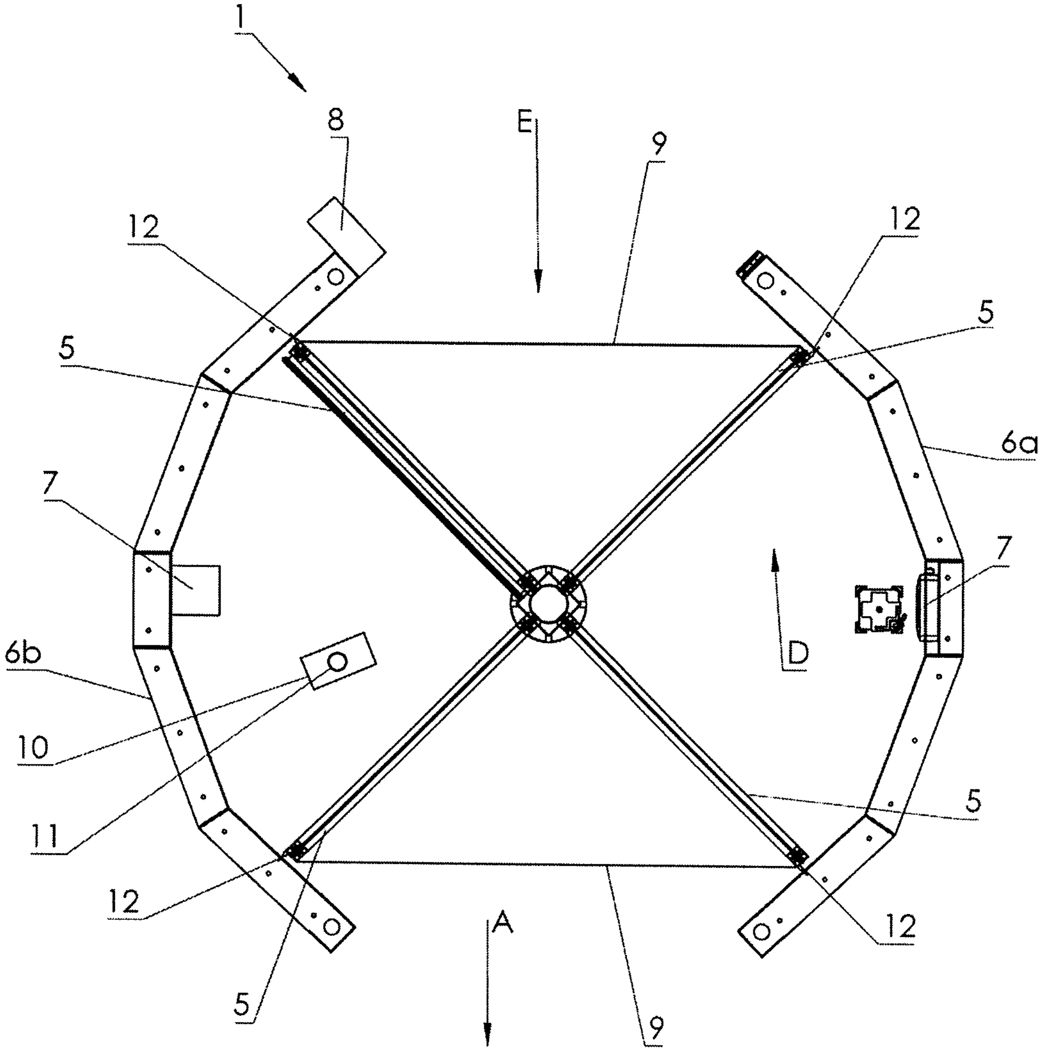
FIG. 2 is a plan view of the revolving door from FIG. 1 in the reading position.

FIG. 2 is an illustration of a sectioned view of the revolving door 1 as a plan view. In this embodiment, four door leaves 5 which are arranged at an angle of 90 degrees with respect to each other are provided. The revolving door 1 is located in the reading position. In this instance, the accessible passage spaces which are each delimited by two door leaves 5 which are arranged at a right angle with respect to each other are completely covered by a part-circular wall portion 6*a*, 6*b* which overlaps the door leaves 5. The accessible passage space is consequently in each case electromagnetically shielded by the door leaves 5 and the adjacent part-circular wall portion 6*a*, 6*b*.

The door leaves 5 preferably have for electromagnetic shielding a suitable metal structure or are completely formed from metal. The door leaves 5 may, for example, also have glass faces which contain or carry a metal fabric. This metal fabric may, for example, be bonded as a film to the door leaf face. The metal structure of the door leaf 5 is then preferably connected to common earth potential via electrically conductive frame elements of the door leaves 5.

It is clear that at least one passage space in the reading position is provided with an electronic reading unit 7. This is directed towards the passage space in the reading position in such a manner that the objects 10 located in the passage space or the transponders 11 thereof can be responded to. The electronic reading unit 7 is controlled in such a manner that it transmits electromagnetic waves for interrogating transponders only in the reading position.

It is conceivable for both mutually opposing passage spaces to have a reading unit 7 in each case. This option is indicated by the dashed second electronic reading unit 7 at the right-hand side.

It can further be seen that the revolving door 1 in the reading position cannot be accessed in the entry region E and exit region A. The space located between the respective pairs of door leaves 5 is in each case closed with a partition wall 9 which is connected to the two door leaves 5 which adjoin the entry region E or exit region A in each case. This partition wall 9 may as illustrated together with the door leaves 5 form a triangular face. However, it is also conceivable for the partition wall 9 to be curved or angular in order to form a circular segment or a non-regular polygon in cross-section.

It is further clear that sealing elements 12 are arranged in each case at the end edge of the door leaf 5 in the transition between the door leaves 5 and the adjacent wall portion 6*a*, 6*b*. These comprise electrically conductive material, such as, for example, metal wires or a metal sponge. They may be constructed as sealing strips, which bring about an electromagnetic shielding. It is conceivable to use carbon fibres or other metal yarns. Such electrically conductive elements can be combined to form bristle or sponge structures, for example, to form a bristle element. By means of these sealing elements 12, the door leaf 5 is contacted in an electrically conductive manner by the adjacent wall portion 6*a*, 6*b* without the door leaf 5 being connected securely to the wall portion 6*a*, 6*b*. The sealing elements 12 are constructed to slide in a touching manner along the respective wall portion 6*a*, 6*b*, that is to say, on the inner face of the wall portion 6*a*, 6*b*.

Figure 3:
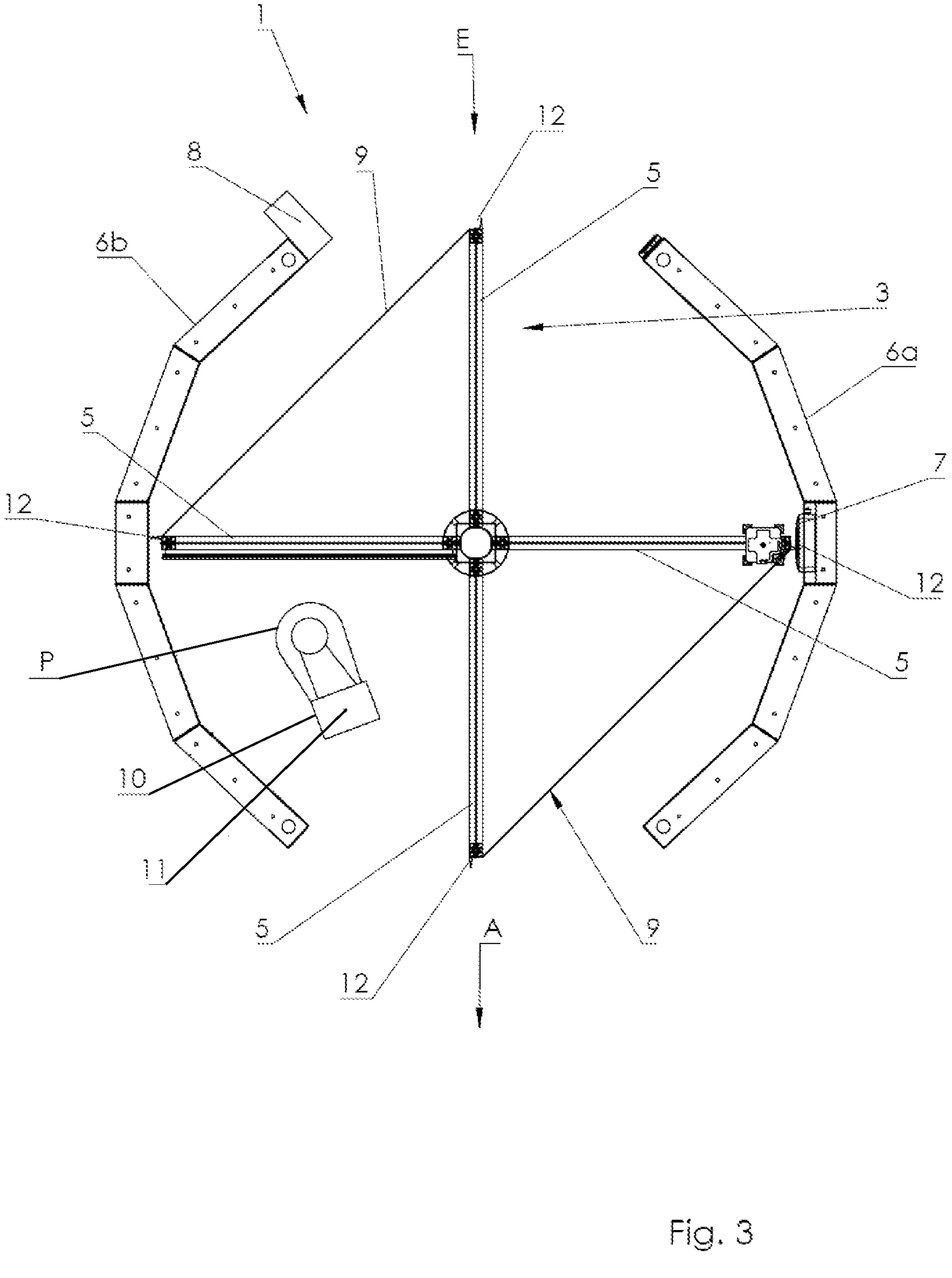
FIG. 3 is a plan view of the revolving door from FIG. 1 in an intermediate position.

FIG. 3 shows the revolving door 1 from FIGS. 1 and 2 in an intermediate position. In this instance, a person P is located with the object 10 which has the transponder 11 which is intended to be read in a passage region which is delimited by two door leaves 5. This is already partially open in the direction towards the exit region A so that the passage region is no longer electromagnetically shielded. The door leaf element 3 is turned further by the person P manually, for example, in the rotation direction D in order to ultimately reach an access position. The electronic reading unit 7 is deactivated in the intermediate position to such an extent that it transmits no electromagnetic waves.

Figure 4:
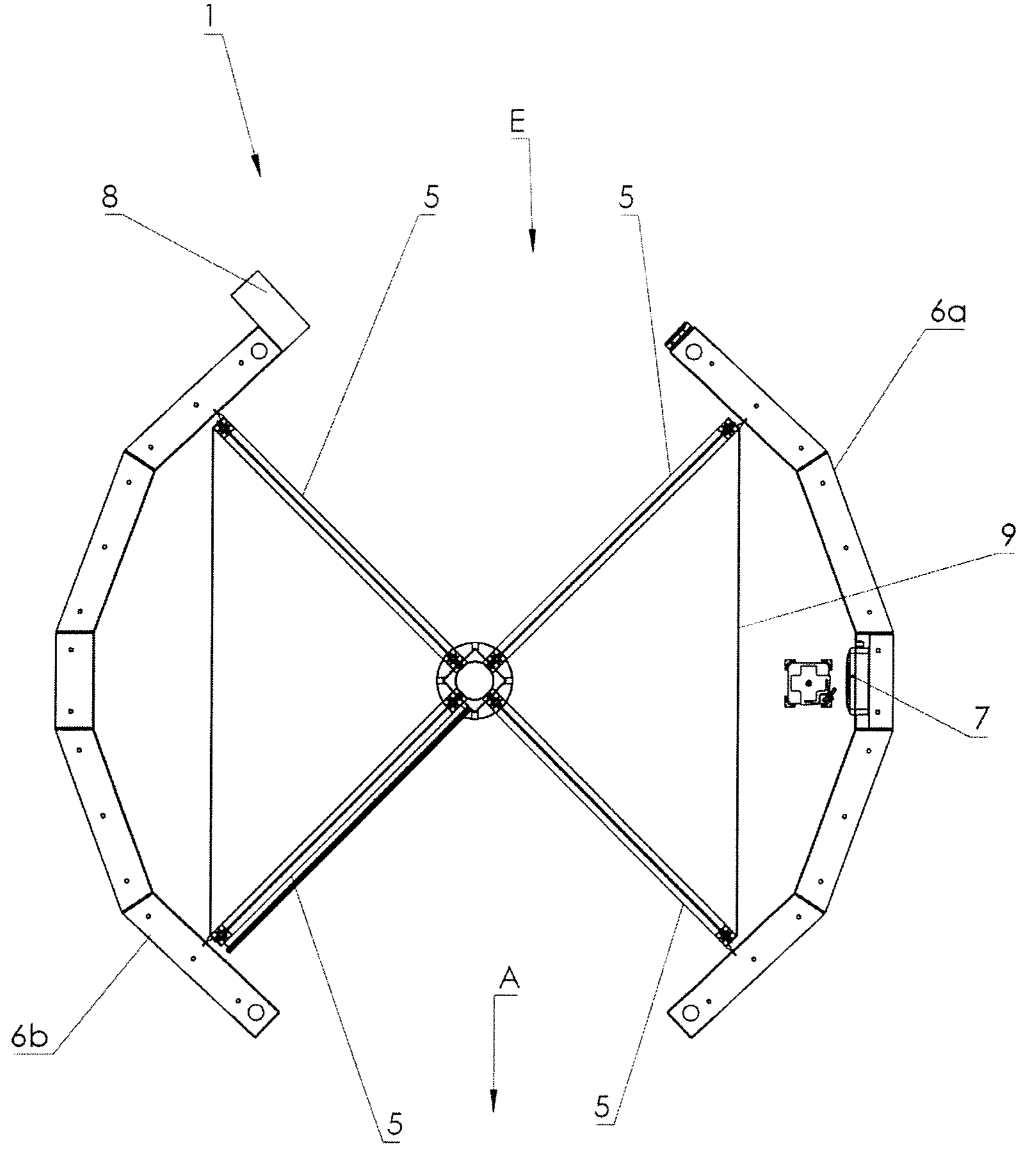
FIG. 4 is a plan view of the revolving door from FIG. 1 in the access position.

FIG. 4 shows the revolving door 1 in this access position. In this instance, two accessible passage regions at the entry region E and at the exit region A are accessible. These passage spaces are laterally delimited only by two door leaves 5 which are arranged at an angle of, for example, 90 degrees with respect to each other.

It is self-evident that the passage spaces and the revolving door 1 are on the whole terminated downwards completely by a floor and also upwards by a ceiling.

It is clear that, in the access position, the regions which cannot be accessed using the partition walls 9 are now laterally terminated by the part-circular wall portions 6*a*, 6*b*.

In the access position, the electronic reading unit 7 is also deactivated to the extent that it emits no electronic waves to interrogate transponders.

Figure 5:
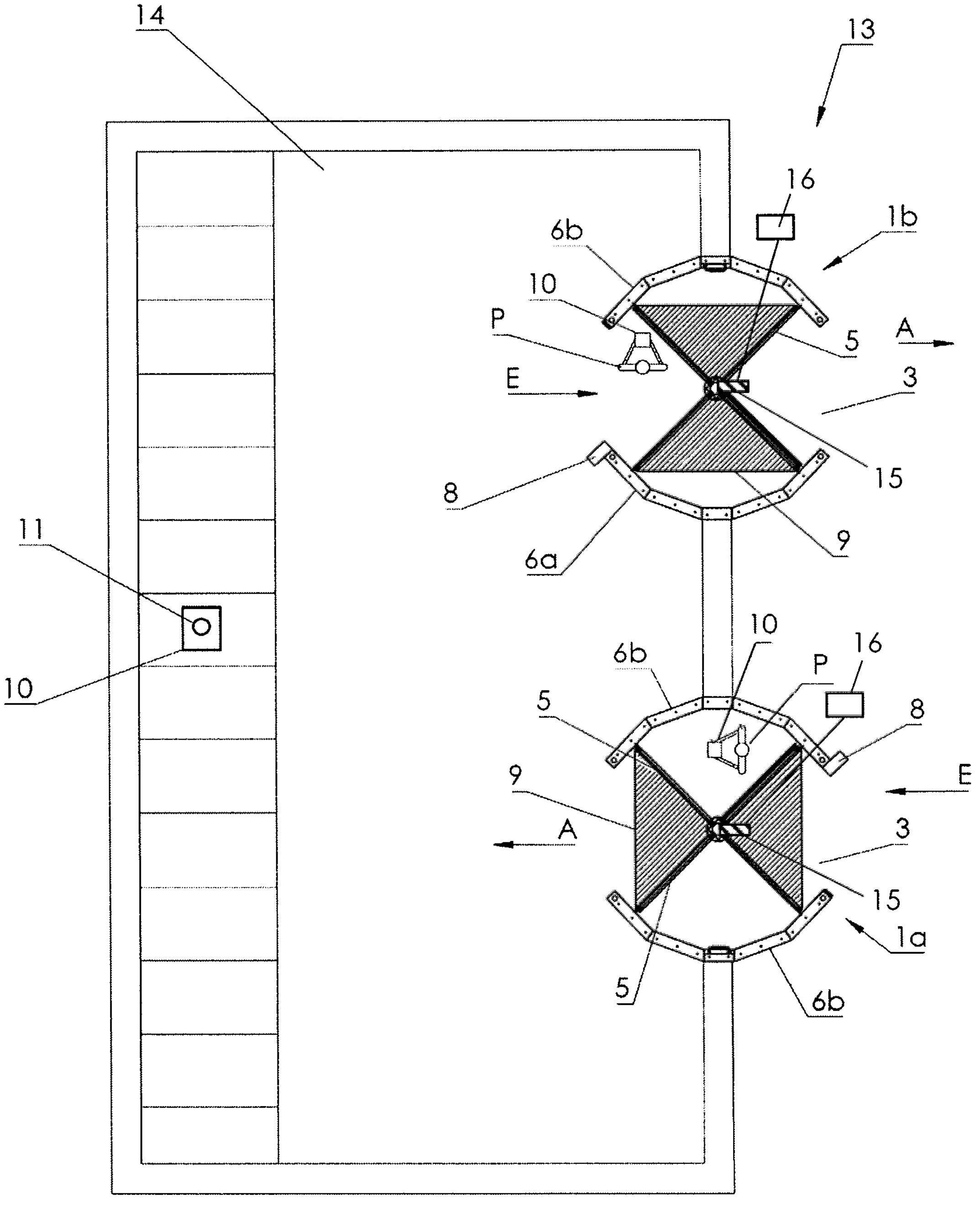
FIG. 5 is a drawing of a room access arrangement having two revolving doors, wherein the first revolving door is constructed to access the inner space and the second revolving door is constructed to leave the inner space.

FIG. 5 is a plan view of a room access arrangement 13 for an inner space 14. This inner space 14 may, for example, be a storage space having a store 15 for objects 10 which are each provided with a transponder 11. Such objects 10 may, for example, be items of washing or other items of equipment. The inner space 14 may, for example, be a washing store. However, it is also conceivable for it to be an equipment store which can be accessed by persons who are intended to take different items of equipment per se.

A first revolving door 1*a* is constructed to access the inner space 14 from the outer side. The first revolving door 1*a* is arranged with the exit side A thereof consequently in the inner space 14 which can be accessed through the revolving door 1*a*.

A second revolving door 1*b* is arranged so as to be accessible in the reverse manner and with the entry region E thereof in the inner space 14 which can be accessed through the revolving doors 1*a*, 1*b*. Consequently, access to the inner space 14 is possible exclusively via the first revolving door 1*a* and leaving the inner space 14 only via the second revolving door 1*b*. This may, on the one hand, be controlled by means of rotation direction control and, on the other hand, by means of access control units 8 which are arranged in the respective entry region.

The person P may in this instance be informed at the entry side E, for example, via a display device of an access control unit 8 or a display unit which is arranged on a door leaf 5 regarding his current status in the object management, for example, with regard to the items of washing which are associated with him/her or other items of equipment.

It is conceivable in this context for a locking element 15 which is connected to a control unit 16 to be coupled to the door leaf element. This is then configured to prevent a rotation of the door leaf element when the access in the entry region has been released by means of the access control unit and in the exit region the presence of a person is detected by means of the person presence detector. In this instance, the person detected in the exit region could enter the revolving door, as could the person in the entry region to which access has been released. The person located in the exit region could then pass through the revolving door in an uncontrolled manner. This is then prevented with the person presence detector for the exit region so that the revolving door can be used only after release by the access control unit via the entry region.

The invention claimed is:

1. A revolving door comprising a rotatable door leaf element which has at least three door leaves which are fitted to a vertical centre axle, at least one part-circular wall portion which is arranged adjacent to a rotation circle of the door leaf element, and an electronic reading unit adapted for wireless reading of data from transponders, wherein the electronic reading unit is orientated towards a reading space delimited by the wall portion and by a pair of door leaves of the at least three door leaves of the revolving door, when the revolving door is in a reading position, wherein the wall portion which delimits the reading space overlaps in the reading position of the revolving door the pair of door leaves which form a passage space in order to electromagnetically shield by contribution of the door leaf element and the wall portion which overlaps the door leaf of the reading space when the revolving door is in the reading position, wherein the revolving door further comprising sealing elements for electromagnetic shielding arranged in the transition between the door leaves of the at least three door leaves and the wall portion, which delimits the reading space.

2. The revolving door according to claim 1 wherein the at least three door leaves comprise four door leaves, wherein a first of the four door leaves which delimit a passage space is by means of a partition wall connected to a second door leaf of the four door leaves which precedes or follows in a rotation direction and consequently the passage space of the revolving door which follows the passage space in the rotation direction is closed.

3. The revolving door according to claim 1 wherein the at least three door leaves comprise four door leaves comprising a total of two respective pairs of door leaves, wherein the door leaf element has two mutually opposing passage spaces which are each delimited by the respective pair of door leaves of the four door leaves.

4. The revolving door according to claim 1, wherein a rotation direction limitation element which is constructed to select a rotation direction of the door leaf element and limit the rotation direction to the determined rotation direction is coupled to the door leaf element.

5. The revolving door according to claim 1, further comprising an access control unit at an entry region arranged to permit an access in the entry region, a person presence detector at an exit region of the revolving door opposite the entry region, and a locking element which is connected to a control unit, wherein the locking element is coupled to the door leaf element and is configured to prevent a rotation of the door leaf element when access in the entry region has not been permitted by the access control unit and in the exit region a presence of a person is detected by means of the person presence detector.

6. The revolving door according to claim 1, further comprising a display unit arranged at the region of the entry into the revolving door or on at least one door leaf, and a data processing unit connected to the display unit, wherein the transponder of an object stores data about the object, and wherein the data processing unit is configured to display on the display unit objects which are associated with a user identified for entry into the revolving door and which are provided with the transponder for data reading, wherein the data about the objects are obtained by the electronic reading unit adapted for wireless reading of the data from the transponder.

7. The revolving door according to claim 1, wherein the revolving door has a predetermined entry side and a predetermined exit side and is constructed to permit passage from the entry side to the exit side and to prevent passage from the exit side to the entry side.

8. A room access arrangement having first and second revolving doors, each comprising a rotatable door leaf element which has at least three door leaves which are fitted to a vertical centre axle, at least one part-circular wall portion which is arranged adjacent to the rotation circle of the door leaf element, sealing elements for electromagnetic shielding arranged in the transition between the at least three door leaves and the respective at least one partly circular wall portion, an electronic reading unit adapted for wireless reading of data from transponders, wherein the electronic reading unit is orientated towards a reading space, said reading space being delimited by the wall portion and a pair of door leaves of the at least three door leaves when the revolving door is in a reading position, and a predetermined entry side and a predetermined exit side, wherein each of the first and second revolving doors is constructed to permit passage from the entry side to the exit side and to prevent passage from the exit side to the entry side, wherein the wall portion which delimits the reading space overlaps in the reading position of the revolving door the pair of door leaves of the at least three door leaves which form a passage space in order to electromagnetically shield by contribution of the door leaf element and the wall portion which overlaps the door leaf of the reading space when the revolving door is in the reading position, wherein the first revolving door is arranged with the exit side thereof in an inner space which can be accessed through the first and second revolving doors, wherein the second revolving door is arranged with the entry side thereof in the inner space, and wherein access to the inner space is carried out via the first revolving door and leaving the inner space is carried out via the second revolving door.

* * * * *